United States Patent
Osborne et al.

(10) Patent No.: US 10,129,134 B2
(45) Date of Patent: Nov. 13, 2018

(54) SYSTEM AND METHOD FOR ADDING ROUTING PATHS IN A NETWORK

(71) Applicant: Level 3 Communications, LLC, Broomfield, CO (US)

(72) Inventors: Eric Osborne, Sutton, MA (US); Brent W. Smith, Arvada, CO (US)

(73) Assignee: Level 3 Communications, LLC, Broomfield, CO (US)

(*) Notice: Subject to any disclaimer, the term of this patent is extended or adjusted under 35 U.S.C. 154(b) by 104 days.

(21) Appl. No.: 15/215,998

(22) Filed: Jul. 21, 2016

(65) Prior Publication Data

US 2017/0250894 A1 Aug. 31, 2017

Related U.S. Application Data (60) Provisional application No. 62/326,165, filed on Apr. 22, 2016, provisional application No. 62/301,018, filed on Feb. 29, 2016.

(51) Int. Cl.
| | |
|---|---|
| *H04L 12/26* | (2006.01) |
| *H04L 12/715* | (2013.01) |
| *H04L 12/721* | (2013.01) |
| *H04L 12/733* | (2013.01) |

(52) U.S. Cl.
CPC ............. *H04L 45/04* (2013.01); *H04L 45/12* (2013.01); *H04L 45/20* (2013.01)

(58) Field of Classification Search
None
See application file for complete search history.

(56) References Cited

U.S. PATENT DOCUMENTS

| | | | |
|---|---|---|---|
| 8,320,361 B2 | 11/2012 | Mohapatra et al. | |
| 2006/0153200 A1* | 7/2006 | Filsfils | H04L 45/02 370/395.31 |
| 2007/0097974 A1 | 5/2007 | Ward et al. | |
| 2009/0296579 A1* | 12/2009 | Dharwadkar | H04L 12/4641 370/235 |
| 2013/0155845 A1* | 6/2013 | Patel | H04L 45/04 370/225 |

(Continued)

OTHER PUBLICATIONS

International Search Report dated Oct. 26, 2016, Int'l Appl. No. PCT/US16/046838, Int'l Filing Date Aug. 12, 2016; 3 pgs.

(Continued)

*Primary Examiner* — Sithu Ko (57) ABSTRACT

Aspects of the present disclosure involve systems, methods, computer program products, and the like, for providing multiple egress points from a telecommunications network for a client of the network. In particular, the process and system allows for multiple provider edges of the network to utilize a route reflector server to provide a border gateway protocol (BGP) route to other provider edges in the network. Further, the multiple provider edges may each announce similar interior gateway protocol (IGP) routes through the network such that a provider edge receiving a packet intended for the customer network may select from the multiple IGP routes to provide the intended packet to the customer network. In this manner, the receiving provider edge may load balance among the various connections of the customer network to the telecommunications network.

18 Claims, 5 Drawing Sheets

(56) References Cited

U.S. PATENT DOCUMENTS

2017/0104676 A1\* 4/2017 Patel ...................... H04L 45/70

OTHER PUBLICATIONS

Written Opinion of the International Searching Authority dated Oct. 26, 2016, Int'l Appl. No. PCT/US16/046838, Int'l Filing Date Aug. 12, 2016; 6 pgs.

International Preliminary Report on Patentability, dated Sep. 4, 2018, Intl Appl. No. PCT/US16/046838, Intl Filing Date Aug. 12, 2016; 8 pgs.

\* cited by examiner

SYSTEM AND METHOD FOR ADDING ROUTING PATHS IN A NETWORK

CROSS-REFERENCE TO RELATED APPLICATIONS

This application is related to and claims priority under 35 U.S.C. § 119(e) from U.S. patent application Ser. No. 62/326,165, filed Apr. 22, 2016, titled "SYSTEM AND METHOD FOR ADDING ROUTING PATHS IN A NETWORK," and U.S. patent application Ser. No. 62/301,018, filed Feb. 29, 2016, titled "MULTI-PATH ROUTING," the entire contents of both of which are incorporated herein by reference for all purposes.

FIELD OF THE DISCLOSURE

Embodiments of the present invention generally relate to systems and methods for implementing a telecommunications network, and more specifically for routing packets for a client to a network with multiple egress points within a particular geographic area.

BACKGROUND

Many telecommunications networks include a route reflector device that receives routing information from devices within and outside the network and re-broadcast or announce the received routes to other devices. Through the route reflector device, devices within the telecommunications network receive an understanding of the connectivity of the network through which communication packets may be transmitted. However, the use of route reflectors may cause undesirable issues for the telecommunications network. For example, many route reflector devices are configured to only broadcast a preferred or "best" route to other devices for customers to the network that have several egress routing paths. This acts to force all traffic from the network to the customer on one route, potentially overloading that route when other open routes are also available. In another example, the route reflector device may be configured to broadcast every received route to a customer end device or network to the network devices. However, as more and more customers are added to the network, the number of potential routes through the network and egressing from the network may quickly exceed the processing and/or storing capabilities of some of the provider edges or route reflectors of the network, thereby slowing down the transmission speed of the telecommunications network.

It is with these and other issues in mind that various aspects of the present disclosure were developed.

SUMMARY

One implementation of the present disclosure may take the form of a method for routing a communication through a telecommunications network. The method may include the operations of receiving a border gateway protocol (BGP) route for a customer network comprising an identifier of the customer network and a customer-specific next-hop value, receiving a plurality of interior gateway protocol (IGP) routes, each of the plurality of IGP routes comprising a route through the telecommunications network to a network device and the customer-specific next-hop value, selecting a route from the plurality of IGP routes based on the received BGP route, and transmitting a received communication along the selected route to the customer network.

Another implementation of the present disclosure may take the form of a telecommunications network device. The device may include a network communication port for communicating with devices of a telecommunications network, a processing device, and a computer-readable medium with one or more executable instructions stored thereon. When the instructions are executed by the processing device, the operations of receiving a border gateway protocol (BGP) route for a customer network connected to the telecommunications network comprising an identifier of the customer network and a customer-specific next-hop value, receiving a plurality of interior gateway protocol (IGP) routes, each of the plurality of IGP routes comprising a route through the telecommunications network to a network device and the customer-specific next-hop value, selecting a route from the plurality of IGP routes based on the received BGP route, and transmitting a received communication along the selected route to the customer network are performed.

Yet another implementation of the present disclosure may take the form of a telecommunications network. The network may include a plurality of edge devices each receiving border gateway protocol (BGP) information from a customer network in communication with a telecommunications network and announcing BGP route information comprising an indication of the customer network and a customer-specific next-hop value and a route reflector device receiving the BGP route information comprising the indication of the customer network and the customer-specific next-hop value from each of the plurality of edge devices, the route reflector announcing one instance of the BGP route information comprising the indication of the customer network and the customer-specific next-hop value. The network may also include a routing device receiving the announced BGP route information comprising the indication of the customer network and the customer-specific next-hop value from the route reflector and a plurality of interior gateway protocol (IGP) routes, each of the plurality of IGP routes comprising a route through the telecommunications network to a network device and the customer-specific next-hop value.

DETAILED DESCRIPTION

Aspects of the present disclosure involve systems, methods, computer program products, and the like, for providing multiple egress points from a telecommunications network for a client of the network. In general, the process allows for a client of the network to receive intended packets of information through multiple connections to the network without the need to exceedingly increase the number of routes through the network. More particularly, the process and system allows for multiple provider edges of the network to utilize a route reflector server to provide a border gateway protocol (BGP) route to other provider edges in the network. Further, the multiple provider edges may each announce similar interior gateway protocol (IGP) routes through the network such that a provider edge receiving a packet intended for the customer network may select from the multiple IGP routes to provide the intended packet to the customer network. In this manner, the receiving provider edge may load balance among the various connections of the customer network to the telecommunications network. Also, as explained in more detail below, the system and process reduces the number of routes maintained by the components of the network over previous solutions for providing multiple egress points from the network.

Figure 1:
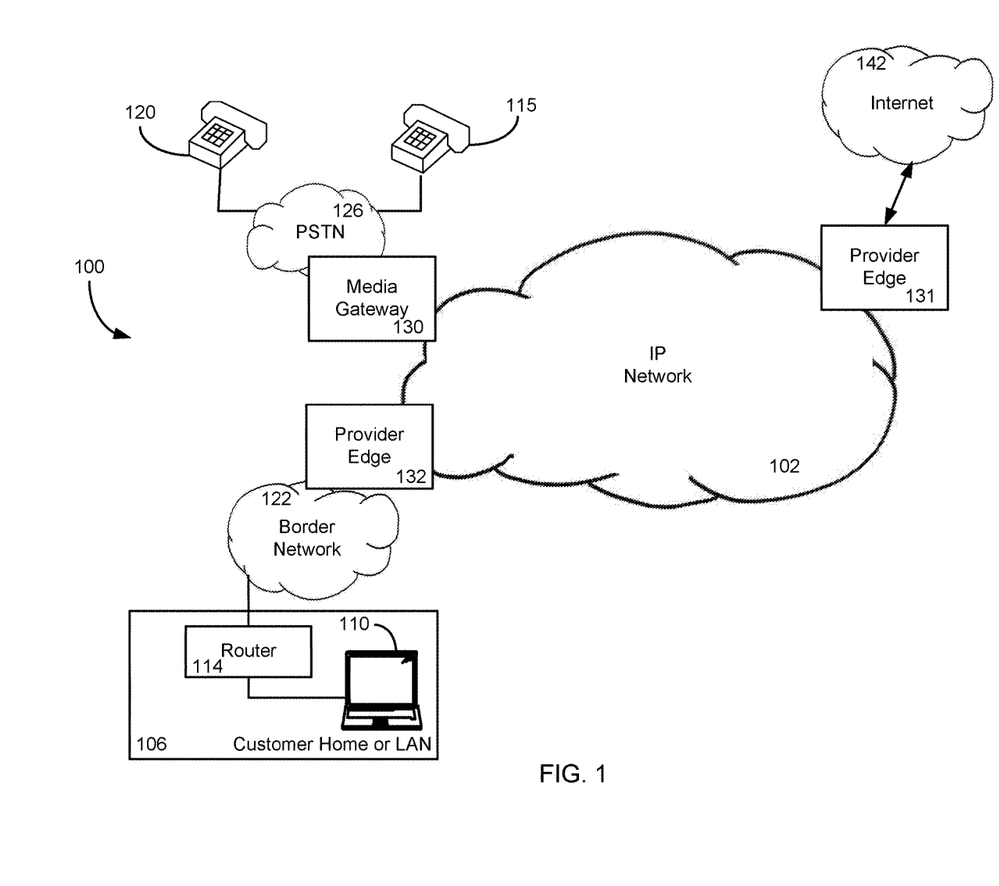
FIG. 1 schematic diagram illustrating an exemplary Internet Protocol (IP) operating environment in accordance with one embodiment.

FIG. 1 illustrates an exemplary operating environment 100 for providing multiple egress points from a telecommunications network for a client of the network. In general, the environment 100 provides for establishing communication sessions between network users and for providing one or more network services to network users. For example, content from a content delivery network (CDN) may be provided to and/or from one or more customers of the network through the operating environment 100 discussed herein. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the IP network 102 via a public switched telephone network (PSTN) 126 operated by a local exchange caroute reflectorier (LEC). Communication via any of the networks can be wired, wireless, or any combination thereof. Additionally, the border network 122 and PSTN 126 may communicate, in some embodiments, with the IP Network 102 through a media gateway device 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

Figure 2:
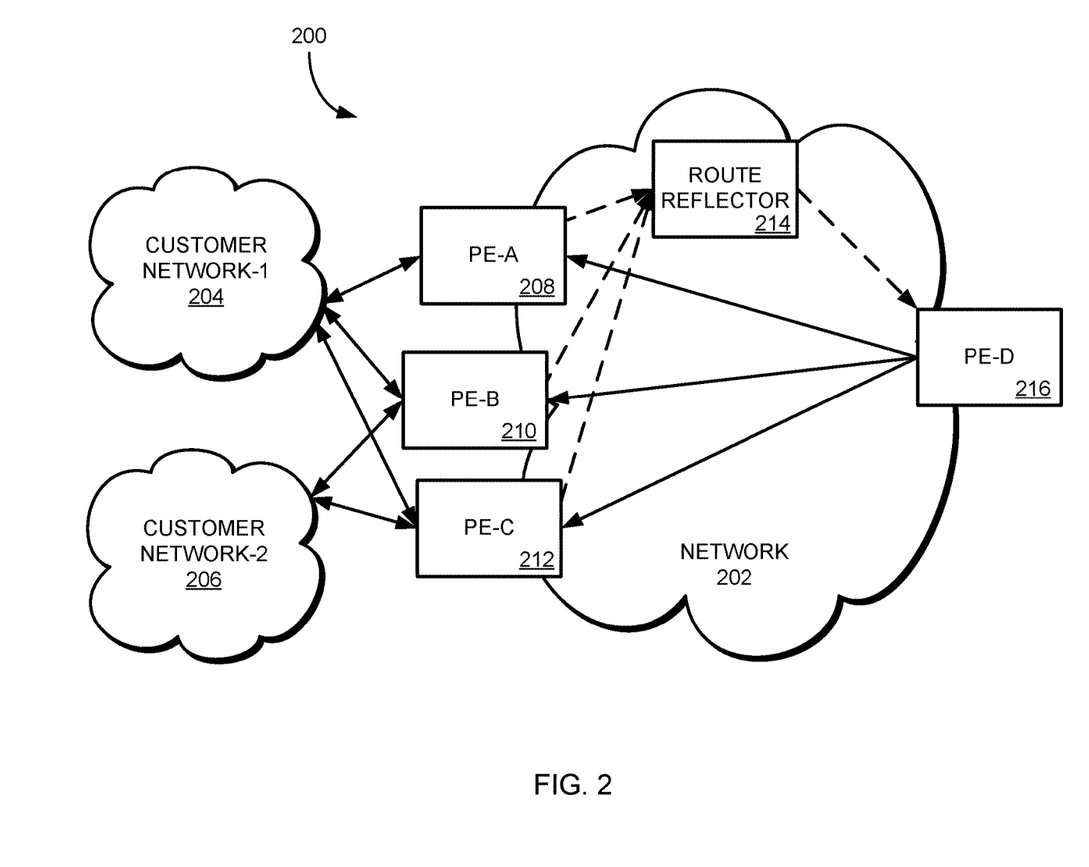
FIG. 2 is a schematic diagram illustrating a network environment to provide multiple routes to a client network through the network environment.

As mentioned above, the telecommunications network may provide an interface to a customer to connect to the network through a provider edge 132. In some instances, a customer network may connect to the telecommunications network through more than one provider edge devices. In particular, FIG. 2 is a schematic diagram illustrating a network environment 200 to provide multiple routes for a client network 204 through the network environment. The telecommunications network 202 of FIG. 2 may be similar to that of FIG. 1 such that the networks may include the same or similar components. Further, client networks 204, 206 connected to the telecommunications network 202 may utilize the network to send and receive packets of information to/from other customers to the network.

As shown in FIG. 2, a client network (designated CN-1 204) connects to the network 202 through multiple provider edge devices or networks. In particular, CN-1 204 connects to the network 202 through provider edge 1 208, provider edge 2, 210, and provider edge 3 212. The connections between the customer network 204 and the provider edges 208-212 provide three or more routes between the customer network and the telecommunications network 202 along which communications or packets may be transmitted. It should be appreciated, however, that the customer network 204 may connect to the network 202 through any number of edge devices in any locations. For example, the customer network 204 may connect to a first provider edge located in San Francisco, Calif., and a second provide edge located in Dallas, Tex. In the particular embodiment illustrated in FIG. 2, however, each of the provider edges 208-212 are located within the same geographic area. For example, the provider edges 208-212 may be located in a single metro area. A second customer network (CN-2 206) is also illustrated as connected to provider edge 2 210 and provider edge 3 212. Thus, each provider edge 208-212 may include several communication ports through which several customers of the network 202 (such as CN-1 204 and CN-2 206) may communicate and transmit packets of information to/from the network.

In one particular configuration, the network 202 may include a route reflector device or server 214. In general, the route reflector 214 is a server that receives an announced route from a telecommunications device and broadcasts the received route to other devices in the network 202. As utilized in the network 202 of FIG. 2, the route reflector 214 receives routes announced from provider edges 208-212 and broadcasts the received routes to other provider edges, servers, media gateways, etc. of the network 202. The use of the route reflector 214 in the network 202 removes the need for each device of the network to communicate its announced route to each of the other devices in the network. Rather, the route reflector 214 announces each received route to each other devices itself so that each device in the network is not tasked with announcing routes to each other device.

In one particular embodiment, the route that is received and broadcast by the route reflector 214 is a border gateway protocol (BGP) route announced by the transmitting provider edge 208-212. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies and/or rule-sets for transmission along the path, among other information. The BGP feed may also include Interior Gateway Protocol (IGP) information for network routes within an AS or network and/or other network information that pertains to the transmission of content from the network. However, as described below, BGP information mainly describes routes used by the network 202 to connect to external networks or customers (such as CN-1 204 and CN-2 206) while IGP information describes routes through the network to connect one provider edge (such as provider edge 216) to another provider edge (such as provider edge 208) through a telecommunications network.

One or more of the components of the network 202 may announce through a BGP session routes serviced by that component. For example, PE-A 208 may provide a BGP announcement that indicates which networks (such as CN-1 204) that may be accessed through PE-A. Thus, the BGP announcement for PE-A 208 may include a path and next-hop information that designates a path along which packets may be transmitted or received from the connected networks (such as CN-1). The next-hop information generally identifies a particular device of the network 202 through which an destination end device or network is available. Further, because two such customer networks 204, 206 are connected to PE-B 210, the BGP announcement from PE-B may include routing information for both CN-1 and CN-2 (i.e., routing information for providing communication packets to CN-1 204 and CN-2 206). In one embodiment, the BGP announcements from the provider edges 208-212 are provided to the route reflector 214 for re-broadcasting to other components of the network 202. Through this process, each component of the network 202 may become aware of the egress ports available for each of the customers 204, 206 connected to the network and how to route packets intended for those connected networks.

When a customer to the network 202 has a single access port to/from the network 202, the route reflector 214 announces the received BGP routing information for the single access port. However, in some circumstances, a customer has multiple connections to the network 202. In the example illustrated in FIG. 2, route reflector 214 receives BGP routing information for CN-1 204 from PE-A 208, PE-B 210, and PE-C 212 as that particular customer network is connected to each of the three provider edges. In other words, packets or communications intended for CN-1 204 may be transmitted through any of PE-A through PE-C. However, some route reflectors 214 may only repeat or broadcast a single access route when several possible routes for a destination are received at the route reflector. For example, the routing information provided by PE-A through PE-C indicates that packets may be sent to CN-1 204 through PE-A 208, PE-B 210, or PE-C 212. However, in many cases, the route reflector 214 is configured to select a "best path" based on network metrics and broadcast the single "best path" to other network devices (such as PE-D 216). Thus, each device in the network 202 may only receive a single routing path through one of the possible multiple egress ports to the particular customer network. As such, all traffic for a customer network connected to the telecommunications network 202 is limited to egress through selected "best path" or selected provider edge, reducing the potential network performance gained through multiple connections to the network.

To address this issue of selection of a "best path" by the route reflector 214, a route reflector device may be configured to relay more than one route path for a given BGP prefix (or customer network). Continuing the example above, route reflector 214 may announce to PE-D 216 that CN-1 204 is available through PE-A 208, PE-B 210, or PE-C 212. In turn, PE-D 216 may be configured to select along which route to send traffic designated with the prefix associated with CN-1 204. In some instances, PE-D 216 is configured to load share packets intended for CN-1 204 over the multiple routes announced through the BGP announcement from route reflector 214.

One potential issue with configuring the route reflector 214 to repeat or broadcast multiple routes or paths for a client destination or network is the increase in the number of possible routes to all network customers received and stored at the devices of the network 202. For example, through the mechanism described above, PE-D 216 would receive three possible routes to access CN-1 204 from the route reflector 214. In addition to the routes for CN-1 204, the route reflector 214 would also receive and broadcast two routes to access CN-2 206 through PE-B 2120 and PE-C 212. These routes would also be repeated out to PE-D 216 through a similar BGP session and/or announcement procedure. This process is typically executed for each customer and/or destination connected to the network 202 such that PE-D 216 may maintain or store several million route paths for all of the possible destination devices and/or networks associated with the telecommunications network. As more and more connections for a customer network 204, 206 are added to the network, the number of potential routes through the network and egressing from the network may quickly exceed the processing and/or storing capabilities of some of the provider edges or route reflectors of the network.

Figure 3:
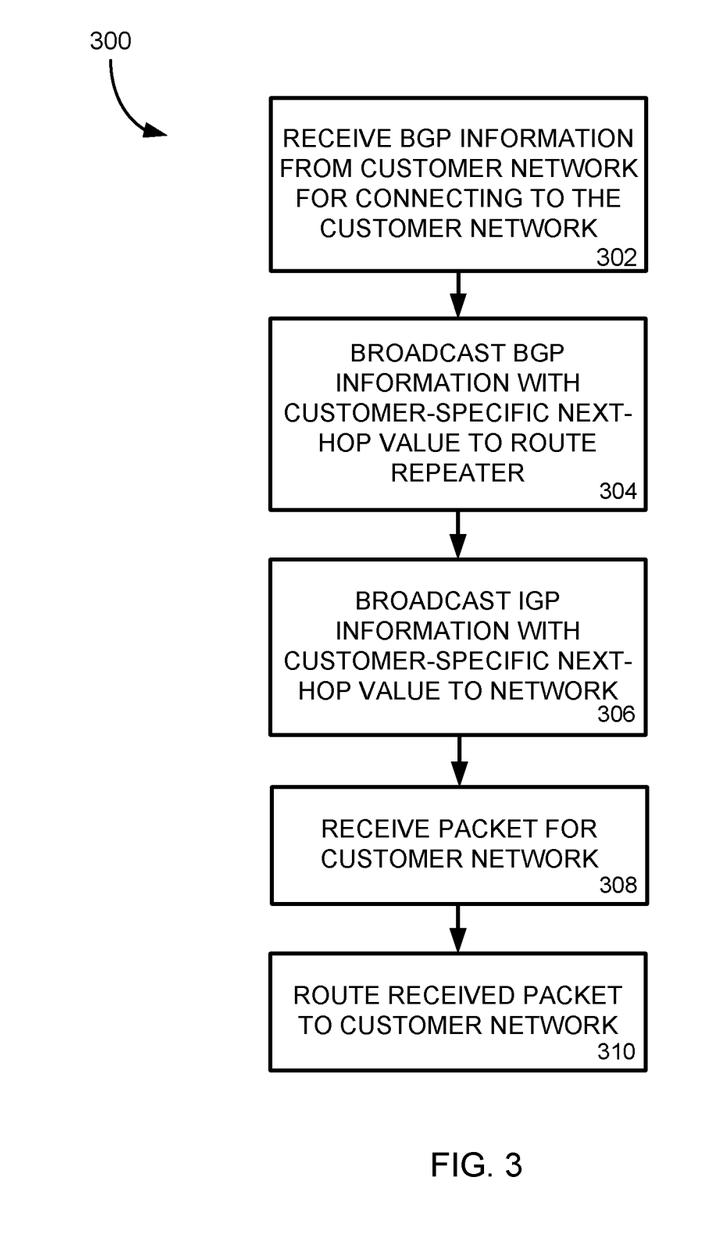
FIG. 3 is a flowchart illustrating a method for a provider edge of a telecommunications network to broadcast border gateway protocol (BGP) and interior gateway protocol (IGP) announcements with a customer-specific value.

To reduce the number of routes maintained by the provider edges and/or other components of the network 202, an alternate process is now introduced for providing multiple routes to/from the network 202 for a customer network 204. In particular, FIG. 3 is a flowchart illustrating a method 300 for a provider edge of a telecommunications network 202 to broadcast border gateway protocol (BGP) and interior gateway protocol (IGP) announcements with a customer specific value. Through the operations of the method 300 of FIG. 3, the network 202 may provide multiple routes through the network for a particular customer network 204 without significantly increasing the number of routes maintained by the components of the network. In addition, the method 300 allows for devices within the network 202 to continue to load balance among many possible routes of the network.

Beginning in operation 302, the provider edge (PE-A 208 in this particular example) receives BGP information from a customer network (CN-1 204 in this example). The BGP information from CN-1 204 may be received during a BGP session between PE-A 208 and CN-1 and includes information for connecting to the network. For example, the BGP information may include an autonomous system (AS) identifier and/or other route path information that the network 202 may utilize to determine which route to transmit packets or communications intended for CN-1. Upon receiving the BGP information from CN-1 204, PE-A 208 may add next-hop information to the received BGP information and broadcast the amended BGP information to other components of the network 202, such as route reflector 214. In general, PE-A 208 provides BGP information to the route reflector 214 through a BGP session between the components. Through this session, PE-A 208 provides BGP information that includes the received route and a next-hop identifier that is associated with PE-A, along with other parameters. Thus, in the above example where the route reflector 214 selects the best path, each provider edge connected to the CN-1 204 would provide the same routing information with a different next-hop value associated with the broadcasting provider edge. The route reflector 214, in turn, would select the "best route" and broadcast to PE-D 216 the BGP information of the selected route, including the next-hop value associated with the selected route. In the embodiment above where the route reflector 214 relays more than one route path for a particular customer network, the route reflector announces all of the received BGP routes with the different next-hop values and allows the receiving components to select which route to utilize.

In one particular embodiment, the method 300 of FIG. 3 includes adding a customer-specific next-hop value in the announced BGP route. For example, each provider edge 208-212 receiving BGP information from CN-1 204 is programmed or otherwise configured to provide a customer-specific next-hop value associated with CN-1. One such next-hop value may be, for example, 1.1.1.1. However, it should be appreciated that the next-hop value for a particular client or customer network may be any value transferable over a BGP session. For other customers or customer networks (such as CN-2 206), a different customer-specific next-hop value is associated with received routes. For example, the next-hop value for CN-2 206 may be 1.1.1.2. Further still, the next-hop value may be limited to certain geographic areas. Thus, a portion of CN-1 204 connecting to the network 202 in San Francisco would have a first next-hop value while a different portion of CN-1 connecting to the network in Houston would have a different next-hop value.

With the customer-specific next-hop value attached, each PE 208-212 receiving BGP information from the customer network 204 transmits the same BGP route information to the route reflector 214 in operation 304. Thus, PE-A 208, PE-B 210, and PE-C 212 would provide BGP route information that includes the received route and the customer-specific next-hop value to the route reflector 214. Further, each provider edge transmitting the BGP route is configured to provide packets or communications from the network 202 that utilize the customer-specific next-hop value to the customer network 204 associated with next-hop value.

In some instances, the route reflector 214 relays the received BGP route information to other components in the network 202, such as PE-D 216. However, because the route reflector 214 receives the same routing information from each of the PEs connected to CN-1 204, the route reflector 214 relays a single BGP route comprising the customer network route (such as the AS of the customer network) and the customer-specific next-hop value. In another embodiment, the route reflector 214 relays the three received routes (even though the three received routes from PE-A 208 through PE-C 212 are the same) to PE-D 216. PE-D 216 may be configured to recognize the identical routes and elect to maintain only one of the duplicate routes to CN-1 204. Through the use of the customer-specific next-hop value, the number of routes broadcast or maintained by PE-D 216 is thereby reduced as the same routing information is received at the route reflector 214 for packets intended for CN-1 204.

In addition to broadcasting the same BGP route with the customer-specific next-hop value, each provider edge is configured to broadcast IGP information to the network 202 with self-identifying information and the customer-specific next-hop value in operation 306. As mentioned above, IGP information is used by the network 202 to describe routes between components through the network. In other words, components of the network 202 utilize the IGP information to know how to route communications from one component of the network to another. Thus, PE-D 216 maintains IGP routing information to determine routes through the telecommunications network 202 to transmit packets to PE-A 208, PE-B 210, or PE-C 212. This IGP information for the components of the network 202 is transmitted from component to component through IGP sessions between the components of the network. As such, PE-D may receive IGP information concerning PE-A 208 through PE-C 212 that describes routes available through the network to connect PE-D to PE-A, PE-B 210, and/or PE-C.

As mentioned, PE-A 208 through PE-C 212 are configured to announce IGP routing information to the network 202. In one particular embodiment, the IGP information includes an identifier of the announcing PE 208-212 and the customer-specific next-hop value discussed above. Once received at PE-D 216, the IGP routing information may be stored or otherwise maintained by PE-D. These IGP routes inform PE-D 216 (and other components of the network 202) that packets or communications with the customer-specific next-hop value may be transmitted to any of PE-A 208, PE-B 210, or PE-C 212 as each PE has announced through the IGP information that they may transmit such packets to the customer network 204.

By providing IGP routing information for multiple egress ports from the network 202 to a customer network 204 rather than having the route reflector 214 announce multiple BGP routes to the customer network, the network components may maintain a smaller total number of routes for routing packets or communications. As mentioned above, a network device may maintain millions of BGP routes for each customer or device in communication with the network 202. This number may increase significantly for networks that utilize a route reflector 214 to relay multiple BGP routes for customers of the network 202 that are connected to the network through multiple ports. In contrast, the number of IGP routes maintained by a network device is far smaller than the number of potential BGP routes as the routes through the telecommunications network 202 are generally limited by the network configuration. In other words, there are only so many paths through the network 202 that connect PE-D 216, for example, to PE-A 208. The system and method described herein utilizes the limited potential IGP routes through the network 202 to provide the multiple egress ports to a particular customer network 204. Thus, rather than significantly increasing the BGP routes maintained at each device of the network 202, each device may receive a single BGP route for a customer network 204 with multiple connections to the network. The multiple connections are then described in IGP routes through the network 202 and each device may then select from those IGP routes to route a communication to a device connected to the customer network 204. In this manner, multiple egress/ingress ports may be utilized by a customer network 204 without significantly increasing the number of BGP routes maintained by the network components.

In operation 308, the provider edges of the network 202 receive a packet or communication intended for a particular customer network routed to the provider edges with the customer-specific next-hop value. As mentioned above, the PEs may be configured to recognize the customer-specific next-hop value as being associated with a connected customer network 204. The received packet may also include a destination address (such as an IP address) for a destination within the customer network 204. Thus, in operation 310, the receiving PE routes the received communication or packet to the customer network 204 based on the customer-specific next-hop value and/or other routing information associated with the packet. In this manner, the provider edges 208-212 of the network 202 may route packets through multiple egress/ingress ports to the customer network 204.

Figure 4:
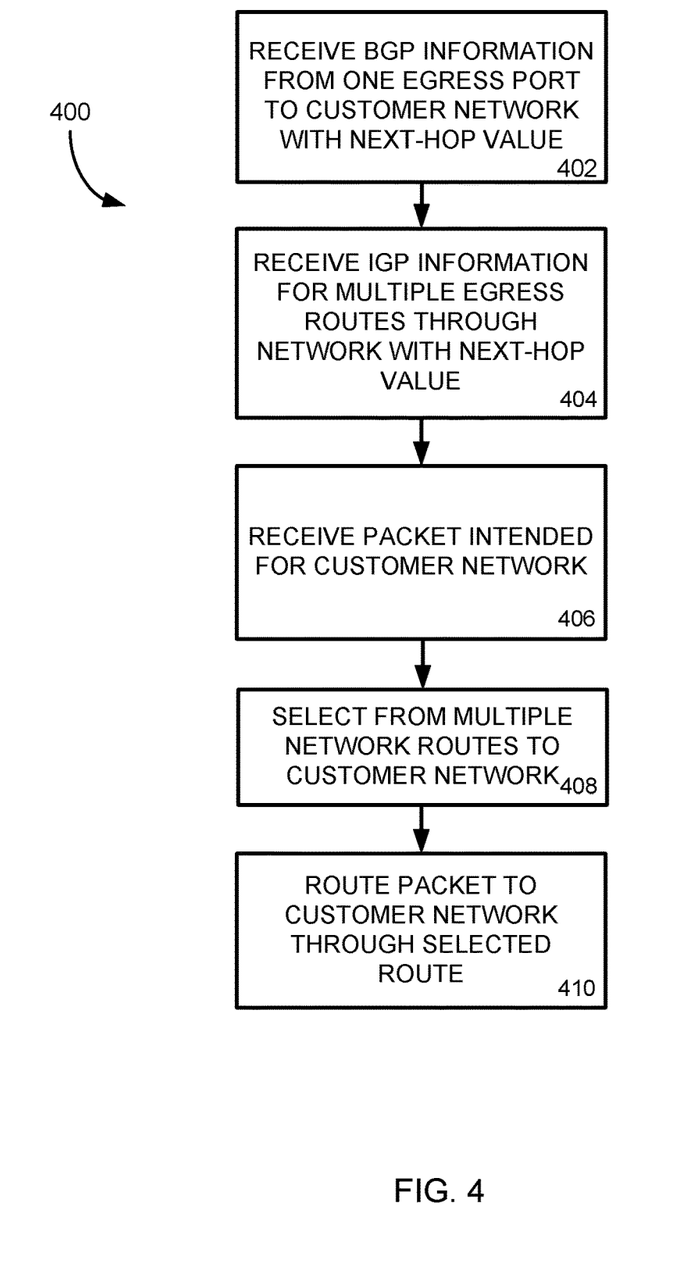
FIG. 4 is a flowchart illustrating a method for a provider edge of a telecommunications network to transmit a packet to a customer network based on a customer-specific value as a next-hop value.

FIG. 4 is a flowchart illustrating a method 400 for a provider edge 216 of a telecommunications network 202 to transmit a packet to a customer network 204 based on a customer-specific value as a next-hop value. The operations of the method 400 may be performed by a provider edge (such as PE-D 216) or any other component of the network in response to receiving a packet or communication intended for a customer network (such as CN-1 204). Such a communication may be provided by a component within the network 202 (such as a content server) or from a telecommunications device external to the network (such as a content server of a provider network).

Beginning in operation 402 and utilizing PE-D 216 as a specific example, the PE receives a BGP announcement that includes one egress route to a customer network that includes the customer-specific next-hop value as described above. In one example, the BGP route information is received at PE-D 216 from route reflector 214 as announced from a provider edge connected to the customer network 204. PE-D 216 may store or otherwise maintain the received BGP route with the customer-specific next-hop value for routing of communications to the customer network.

In operation 404, PE-D 216 receives IGP announcements indicating multiple egress routes through the network 202 associated with the customer-specific next-hop value. For example, PE-D 216 may receive an IGP announcement (or a relayed announcement) for PE-A 208, PE-B 210, and PE-C 212 indicating that communications associated with the customer-specific next-hop value may be egressed from the network 202 through those particular PEs. In other words, the IGP announcements indicate to PE-D 216 that packets intended for the customer network 204 may be sent to any of PE-A 208 through PE-C 212. Similar to the BGP route information, the IGP route information may also be stored or otherwise maintained by PE-D 216 for use in routing packets to the customer network 204.

PE-D 216 receives a packet or communication intended for the customer network 204 in operation 406. As mentioned, the packet may include routing information that identifies the customer network 204 and/or a next-hop value associated with the customer network. Continuing the above example, the packet may include a next-hop value of 1.1.1.1 associated by the network 202 with CN-1 204. Through the stored BGP information, PE-D 216 may determine that next-hop value 1.1.1.1 is associated with CN-1 204 as provided from route reflector 214 to PE-D. In addition, through the received IGP information, PE-D 216 may determine that next-hop value 1.1.1.1 allows access to the CN-1 204 through PE-A 208, PE-B 210, or PE-C 212 and along which route through the network 202 that PE-A, PE-B, and PE-C may be reached. Thus, through a combination of the BGP route (based on the customer-specific next-hop value) and the IGP route information through the network 202, PE-D 216 may determine which route through the network to transmit the received packet.

In operation 408, PE-D 216 may select a preferred route through the network 202 from the multiple egress routes known to the customer network 204. For example, through the received IGP information, PE-D 216 is aware of three egress ports from the network 202 to the customer network 204, namely PE-A 208, PE-B 210, or PE-C 212. Thus, PE-D 216 selects one of the multiple routes to the customer network 204 to transmit the received packet. In one embodiment, PE-D 216 may select a "best route" based on any type of network performance metric and transmit the packet along the selected route. In another embodiment, PE-D 216 may load balance among the known egress ports to the customer network 204 and may select the egress route accordingly. Regardless of the configuration of PE-D 216, the provider edge routes the received packet to the customer network along the selected route in operation 410.

In one embodiment of the system to provide multiple connections from a customer network to a telecommunications network, the customer-specific next-hop value may be provided by the PEs based on a signal from the customer network 204. In this embodiment, the customer network 204 may routinely provide a value or signal to the connected PEs 208-212. In response to receiving the value or signal, the connected PEs 208-212 may broadcast the customer-specific next-hop value as described above. Further, the PEs connected to the customer network 204 may alter the announced BGP information based on whether the dummy value is received from the customer network 204. For example, in some circumstances the connection between the customer network 204 and the provider edge 208 may be lost (such as when a component of the connection is disabled). With the lost connection, the provider edge 208 may no longer receive the value or signal from the network. In such cases, the provider edge 208 may be configured to stop transmitting the BGP and IGP information to the telecommunications network 202 that includes the customer-specific next-hop value, indicating that the customer network 204 may no longer be accessed through the provider edge. In this manner, the system may be configured to provide protection to the network 202 when a link to a customer network 204 is lost.

Figure 5:
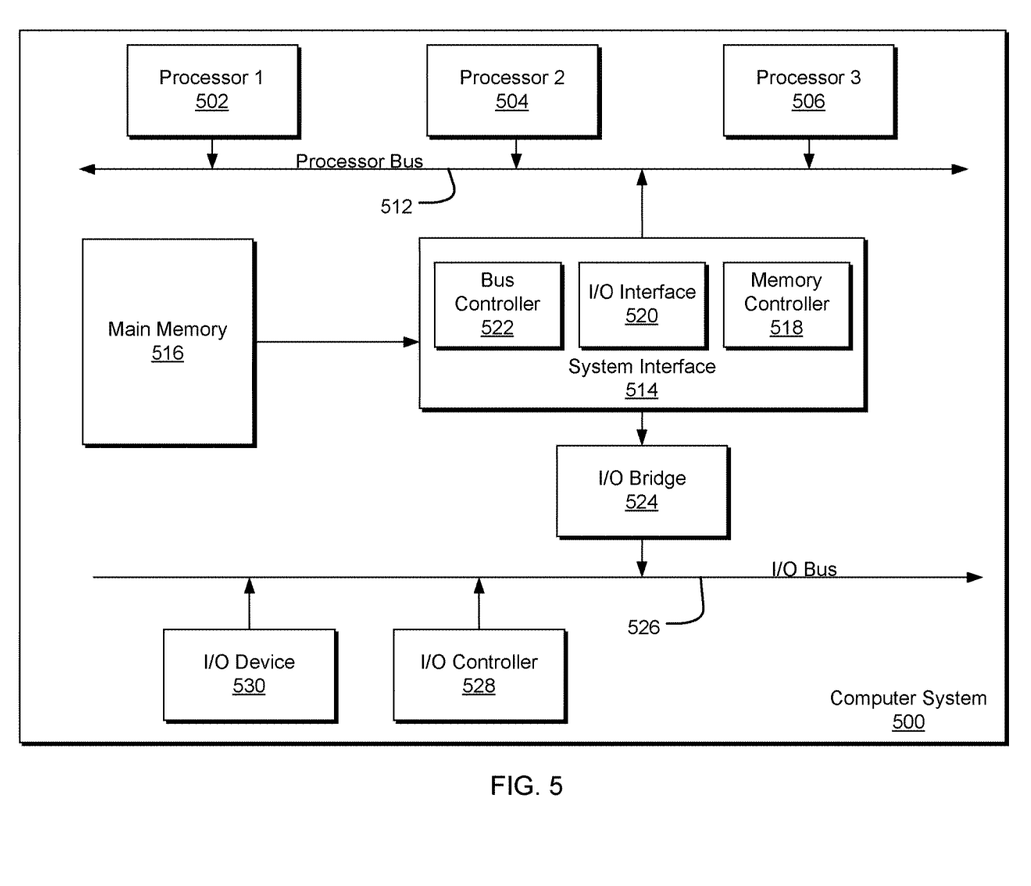
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the provider edge device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for routing a communication through a telecommunications network, the method comprising:
   receiving a common border gateway protocol (BGP) route from a plurality of network edge devices for a customer network each comprising an identifier of the customer network and a customer-specific next-hop value;
   receiving a plurality of interior gateway protocol (IGP) routes broadcasted from a route reflector device of the telecommunications network, each of the plurality of IGP routes comprising a route through the telecommunications network to a network device and the customer-specific next-hop value;
   selecting a route from the received plurality of IGP routes based on the received common BGP route; and
   transmitting a received communication along the selected route to the customer network.

2. The method of claim 1 wherein the received common BGP route for the customer network is received from a route reflector device of the telecommunications network.

3. The method of claim 2 wherein the route reflector receives a plurality of BGP routes for the customer network from the plurality of network edge devices, each of the plurality of network edge devices in communication with the customer network.

4. The method of claim 3 wherein each of the plurality of network edge devices transmits a unique one of the plurality of IGP routes to the telecommunications network.

5. The method of claim 1 wherein selecting the route from the plurality of IGP routes comprises selecting a logical shortest route through the telecommunications network.

6. The method of claim 1 wherein the customer network connects to the telecommunications network in a plurality of geographic locations, the method further comprising:
   receiving a second BGP route for the customer network comprising an identifier of the customer network and a second customer-specific next-hop value based on the geographic location of the connection of the customer network to the telecommunications network.

7. The method of claim 3 wherein each of the plurality of network edge devices receive a connection signal from the customer network indicating the customer network is in communication with a respective network edge device.

8. A telecommunications network device comprising:
   a network communication port for communicating with devices of a telecommunications network;
   a processing device; and
   a non-transitory computer-readable storage medium with one or more executable instructions stored thereon, wherein the processing device executes the one or more instructions to perform the operations of:
      receiving a common border gateway protocol (BGP) route from a plurality of network edge devices for a customer network connected to the telecommunications network each comprising an identifier of the customer network and a customer-specific next-hop value;

receiving a plurality of interior gateway protocol (IGP) routes broadcasted from a route reflector device of the telecommunications network, each of the plurality of IGP routes comprising a route through the telecommunications network to a network device and the customer-specific next-hop value;

selecting a route from the received plurality of IGP routes based on the received common BGP route; and transmitting a received communication along the selected route to the customer network.

9. The telecommunications network device of claim 8 wherein the received common BGP route for the customer network is received through the network communication port from a route reflector device in communication with the telecommunication network device.

10. The telecommunications network device of claim 9 wherein the route reflector receives a plurality of BGP routes for the customer network from the plurality of network edge devices, each of the plurality of network edge devices in communication with the customer network.

11. The telecommunications network device of claim 10 wherein each of the plurality of network edge devices transmits a unique one of the plurality of IGP routes to the telecommunications network device through the network communication port.

12. The telecommunications network device of claim 8 wherein selecting the route from the plurality of IGP routes comprises selecting a logical shortest route through the telecommunications network.

13. The telecommunications network device of claim 8 wherein the customer network connects to the telecommunications network in a plurality of geographic locations and the processing device further executes the one or more instructions to perform the operation of:

receiving a second BGP route for the customer network comprising an identifier of the customer network and a second customer-specific next-hop value based on the geographic location of the connection of the customer network to the telecommunications network.

14. A telecommunications network comprising:

a plurality of edge devices each receiving border gateway protocol (BGP) information from a customer network in communication with a telecommunications network and announcing BGP route information comprising an indication of the customer network and a customer-specific next-hop value;

a route reflector device receiving common BGP route information comprising the indication of the customer network and the customer-specific next-hop value from the plurality of edge devices, the route reflector announcing one instance of the common BGP route information comprising the indication of the customer network and the customer-specific next-hop value, the route reflector device announcing a plurality of interior gateway protocol (IGP) routes, each of the plurality of IGP routes comprising a route through the telecommunications network to a network device and the customer-specific next-hop value; and a routing device receiving the announced BGP route information comprising the indication of the customer network and the customer-specific next-hop value from the route reflector and the plurality of IGP routes.

15. The telecommunications network of claim 14 wherein the routing device selects a route from the plurality of IGP routes based on the received common BGP route information and transmits a received communication along the selected route to the customer network.

16. The telecommunications network of claim 14 wherein each of the plurality of edge devices transmits a unique one of the plurality of IGP routes to the routing device through the telecommunications network.

17. The telecommunications network of claim 15 wherein selecting the route from the plurality of IGP routes comprises selecting a logical shortest route through the telecommunications network.

18. The telecommunications network of claim 14 wherein the customer network connects to the telecommunications network to the plurality of edge devices in a first geographic location and to a second edge device in a second geographic location, the second edge device transmitting a second BGP route information for the customer network to the route reflector comprising an identifier of the customer network and a second customer-specific next-hop value based on the second geographic location of the connection of the customer network to the second edge device.

* * * * *